Patented Nov. 17, 1931

1,831,928

UNITED STATES PATENT OFFICE

HAROLD R. RAFTON, OF LAWRENCE, MASSACHUSETTS, ASSIGNOR TO RAFFOLD PROCESS CORPORATION, A CORPORATION OF MASSACHUSETTS

METHOD FOR THE ELIMINATION OF FOAM IN PAPER MANUFACTURE AND THE PRODUCT THEREOF

No Drawing.   Application filed June 29, 1927.  Serial No. 202,458.

My invention broadly concerns and has as its object a new and useful method for the reduction, elimination, prevention, or alteration of foam by the use of starch, and by the use of starch in conjunction with adjuvants. It more particularly concerns and has as its object a method for the reduction, elimination, prevention, or alteration of the foam met with under certain conditions in the manufacture of paper; and it also concerns and has as its object the paper produced when this method is applied. Moreover it concerns and has as its further object the betterment of paper machine operation under certain conditions and the improvement of the paper made thereunder, as will be set forth in the detail below.

Whereas adjuvants of various kinds are within the scope of my invention, I especially refer to inorganic adjuvants, and more especially to the generic group known as salts, particularly to salts partly or freely soluble, and of such salts, more particularly to salts of aluminum, as for example aluminum sulphate.

My invention in its preferred embodiment, therefore, relates to the use of starch alone or in conjunction with alum, for the reduction, elimination, prevention, or alteration of foam in paper manufacturing under certain conditions, and to the paper thus made.

Such conditions exist in some cases in connection with the use of a certain type of fillers, especially those which are acid soluble, particularly alkaline earth metal compounds, and more particularly those alkaline earth metal compounds, as oxides, hydroxides, carbonates, or basic modifications of these, or compounds or mixtures of one or more of these, such as are insoluble or substantially insoluble in water. Of these, however, certain ones to which I more specifically refer are calcium carbonate, especially in the form of lime mud such as that produced in the causticizing process, and calcium carbonate and magnesium basic carbonate, used in the filled paper disclosed in my United States Patent No. 1,595,416 of August 10, 1926, and calcium carbonate and magnesium hydroxide, disclosed in my United State Patent No. 1,415,391 of May 9, 1922, and used in the filled paper disclosed in my United States Patent No. 1,598,104 of August 31, 1926. Of course I refer to the fillers mentioned in this paragraph not only in their chemically pure form but also in their commercially produced form containing such impurities as may occur in such commercial products, and also when present with other material so that they constitute only a part, either major or minor, of the whole. It should be stated that any given filler of the type referred to is not necessarily of a uniform particle size; nor are the average particle sizes of the individual fillers necessarily alike, as some of the fillers of the type referred to have relatively coarse grain particles, whereas others are much more finely divided, and some are so finely divided that they may be said to approach or be in the colloidal condition.

There are cases where paper can be made with the type of fillers referred to without foam but the reasons for the absence of foaming in these cases have not yet been completely worked out, and in these cases, of course, my invention is not applicable. In other cases, however, the manufacture of paper containing the type of fillers referred to is attended with so much foaming as to render the paper produced foam marked, and indeed at times to render the paper manufacturing operation itself impracticable, and it is to such cases that my invention is directed. This foaming has been sometimes the chief factor which has prevented fillers of the type referred to from being used on a commercial scale. The presence of a certain amount of foam may be considered as normal in paper manufacture and such foam is usually successfully controlled by well known means.

Of course the amount of foam varies in paper manufacture and the amount of air incorporated into the pulp in the various parts of the process, through agitation, air leakage in pumps, and other means influences the amount of foam somewhat, as is well recognized. The foam which occurs in the cases which I am describing, however, is greater in amount than normal, and so persistent and difficult to break that it cannot be overcome by the usual chemical means or mechanical instrumentalities for combatting foam in paper manufacture, such as by the use of ordinary anti-foam oils or compounds, introduced into the process with or after the addition of the ingredients of the paper, or by the use of jets, showers, sprays, employing water, steam, or compressed air, or by similar or other devices at the headbox or slices or inlet of the paper machine, or over the machine wire, or at or in the dandy roll, and hence this foam is very injurious. This foam adversely affects the "formation" of the paper, produces spots in the paper which reduces its commercial value if it does not indeed render it unmerchantable, makes the paper machine difficult to regulate, and is extremely objectionable in many other respects both from the standpoint of the quality of the paper produced and of the difficulties introduced into the manufacturing operation.

This foam, although existent to a certain extent during the beating and subsequent stages of the paper making process, does not become especially harmful until the paper machine is reached, and at this point the foam which has already formed, or which now forms, collects, and travels along with the pulp on the wire of the paper machine. The paper made while such foam exists as described above contains many foam marks, in some cases—where the foaming conditions are particularly bad—enough literally to touch one another throughout the entire sheet.

In an endeavor to determine the cause of the persistent foam, as experimentation on paper machines of commercial size can be carried on only at very great expense, I attempted to reproduce analogous conditions on a small scale. To this end the apparatus described immediately below was constructed which I have called a "bubbler cell": into one end of a glass tube approximately 2 inches in diameter and 3 inches long, a one-hole rubber stopper was inserted and over the other end of this tube a porous diaphragm, as of 2 layers of fine mesh cloth, was wired close to the end. This gave a device into which compressed air could be introduced through the hole in the rubber stopper, and which caused the air thus introduced to issue out as streams of fine bubbles through the porous diaphragm. A cylindrical jar of about half litre capacity with a mouth about 2½ inches in diameter was obtained and the bottom cut off, leaving an open glass cylinder constricted at one end (the mouth end). A rubber ring was placed around the glass tube at the point where the porous diaphragm was attached, and the tube was then fitted, diaphragm end first, into the mouth of the bottomless jar, the rubber ring making a tight joint. The combination of tube and jar was used in a vertical position, bottom end of jar uppermost. An apparatus was thus obtained which was in effect a glass cylinder with a porous bottom through which could be introduced compressed air. Liquids, or solids in liquid suspension, could be placed in the cylinder in the space above the diaphragm, and be subject to the compressed air coming through the diaphragm in streams of fine bubbles, which bubbled up through the liquid in the cylinder. Bubbles, or foam, could thereby be formed on the surface of the liquid.

On experiment, I found that to a considerable extent this phenomenon of persistent bubbles which had been existent in some cases in the actual paper manufacturing operation with filler of the type referred to could be reproduced on a test scale with the bubbler cell. I found that with certain fillers which give little or no trouble on the paper machine, as clay, bubbles were formed having surfaces which were quite clean and clear and which broke quickly, but with fillers of the type referred to, the bubble surfaces were not clean but were coated with the filler and the volume and persistency of foam produced in such cases was much greater than when, for instance, a clay suspension of the same concentration was used.

These observations led me to the conclusion that the extraordinary persistence of these bubbles or foam is due probably to the gathering of the filler at the bubble surfaces which so toughens or "armors" the bubble surfaces that they do not break like ordinary bubbles or foam.

Having found the probable cause of this persistent foam, I now sought to find a method for its reduction, elimination, prevention, or alteration. After study of numerous agents in the bubbler cell I finally discovered that starch was particularly suitable for the purpose. Starch, in gelatinized form, acted upon the water suspension of the filler of the type referred to, in such a way that the individual particles appeared to gather in flocks, and although the identity of the individual particles was not lost (as could be seen under a microscope) this flocculation seemed to prevent the individual particles from entering the bubble surfaces. Observation of the filler suspension in the bubbler cell before and after the addition of starch showed that by the addition of the starch the bubble surfaces had been cleared from the "armoring" filler, and thus broke easily and quickly.

This I confirmed in a large scale paper machine experimental run in which starch was employed in the beater in connection with fibre and filler of the type referred to, the same furnish previously without the starch having resulted in excessive foaming. The results this time showed that the "armored" bubble effect had been almost or completely eliminated, or at least showed that whatever had caused the large amount of persistent foam had been almost or completely eliminated, and that the paper could be run with very little foam; and also that such foam as did form could be substantially all broken down by the foam killing instrumentalities ordinarily employed at the wet end of a paper machine.

I do not know at present exactly the mechanism of the action of gelatinized starch on fillers of the type referred to, by which it changes the amount and kind of foam formed in some cases when these fillers are used in the paper making process. I am not certain whether it be by the effect of opposite electric charge, or by direct combination, or by other means; but there is some evidence that the starch effects a direct combination with the filler in question, whether it be, however, by chemical combination or by absorption, is a point which is not yet known. A filler, for instance, calcium carbonate and magnesium hydroxide, such as I disclose in my United States Patent No. 1,415,391 of May 9, 1922, when treated in a water suspension with gelatinized starch, flocculates. If this flocculent mass be washed a number of times with water, with intermediate settlings and decantations, until the final wash water gives no test for starch with an iodine solution, and then the washed flocculent mass be viewed under a microscope, it will be seen that the mass on treating with iodine solution is stained a deep blue indicating the presence of a starch-filler complex of some sort.

Moreover, if a suspension of the calcium carbonate and magnesium hydroxide mentioned in the preceding paragraph be treated with gelatinized starch, settled, and the supernatant liquid decanted, and this decanted liquid be used to treat another suspension of calcium carbonate and magnesium hydroxide, and the process repeated, it is possible finally to exhaust the supernatent liquid so that it eventually apparently has most if not all of its filler flocculating properties removed, thereby again indicating the formation of some complex (an association whether chemical, physical or both) with the filler whereby the starch, or that which gives the starch its flocculating property, is removed from the solution. Further evidence to the same effect is adduced from the observation that under any given set of conditions, other things being equal, the more calcium carbonate and magnesium hydroxide used in a paper making furnish, the more starch there is required to control the foam completely.

As a result of a careful study of several more experimental runs made on a paper machine along similar lines, I found that although starch did have a very beneficial effect on running paper with the type of filler referred to, nevertheless there was a tendency for what few stray bubbles might come down with the pulp as it travelled on the machine wire, to collect at the dandy roll, to accumulate gradually, and finally to get on to the pulp web beyond the dandy roll, thereby causing a few foam spots in the paper.

I, therefore, continued my experiments with the bubbler cell in an endeavor to find materials which could be used as adjuvants with the starch to remove the defect above noted. After considerable research, I discovered that certain materials, notably salts, particularly of aluminum, for example alum, gave promise when used with starch in connection with the type of fillers referred to; although it should be noted that the use of alum alone, i. e., without starch, did not result in the removal or diminution of the armored bubble effect in the bubbler cell, nor appreciably effect foaming conditions on the paper machine in cases where, with the type of fillers above referred to, excessive foaming was experienced. The use of alum even with the starch, however, seemed to be contrary to ordinary chemical reasoning in the cases of those fillers of the type referred to which contained a carbonate radicle. This is because the alum in contact with such fillers produces carbon dioxide in the form of gas bubbles, which additional bubbles would be expected to cause rather than to prevent foam. As a matter of fact while the addition of alum in the bubbler cell did cause momentary increase of bubbling, when used with such of the type of fillers referred to as contained a carbonate radicle, these extra bubbles dispersed almost at once, and the bubble surfaces in the cell appeared clear.

To substantiate the bubbler cell tests, I therefore made an experimental run on the paper machine employing both starch and alum with the type of filler referred to and this run showed conclusively that the use of an adjuvant, as alum, with the starch had a markedly beneficial effect. What few stray bubbles had been present when starch had been used without alum were now practically eliminated. Furthermore the running qualities of the stock on the paper machine were distinctly better; and, also, the use of the alum had the further advantage of producing in the paper stock a "feel" more nearly like the paper stock of ordinary clay paper furnishes than had the furnish when the starch alone was used without the alum. This would not be expected as the reaction of the stock was on the alkaline side of the neutral point, and the peculiar "feel" of regular paper making stocks containing clay is ordinarily attributed to the acid condition of these stocks. This improvement in the "feel" of the stock due to the addition of the alum enabled the beater men and machine tenders accustomed to running clay furnished papers more easily to handle the beating, jordaning, and machining of the paper made with the type of the filler referred to. The carbon dioxide gas liberated by the action of the alum on the filler of the type referred to which in this instance contained a carbonate radicle, passed off harmlessly and did not cause a persistent foam. It is apparent then that the use of alum with the starch in conjunction with the fillers of the type referred to represents an important advance in the manufacture of this type of paper.

I am well aware that starch has been used in paper making for a great many years, notably as a sizing agent or assistant, for hardening paper, for increasing retention or the like, but it will be noted that my use of starch is wholly different, as I use starch for none of these purposes but rather as a foam affecting agent. I am well aware also of the fact that alum has been used to cut down foam, particularly that foam which is thought to have its origin in the rosin size, but as I have stated previously, I have found that alum alone, without starch, is of no service in affecting the foam under the specific conditions herein described. I also know that starch has been used in conjunction with alum in paper making, but in most of these cases, starch has been used independently for purposes set forth above in this paragraph, and the alum has been used merely for the regular well known paper making services that alum renders, such as precipitating the rosin size, increasing the retention and the like, and if alum has been used to interact with the starch it has not been used for the purpose I use it, nor used under conditions where my invention is intended or adapted for use. I believe my use of starch, or starch and alum, to be wholly new as I have been unable to discover either by an exhaustive search of the literature, or through personal contact with the industry, that in the papermaking art anyone has hitherto known that starch or starch in combination with alum acts with or on the type of fillers referred to, in a way which makes possible, by the reduction, elimination, prevention, or alteration of the foam, the running of commercial paper with this type of fillers, which without the starch or without the starch and alum, would in some cases be rendered commercially impossible or at least not feasible. This represents a very great practical step in advance and will be of great economic importance, as it renders usable certain desirable inexpensive fillers whose employment has hitherto in some cases been subject to the restrictions imposed by the presence of excessive and persistent foam.

A simple method of practicing my invention is to introduce the fibrous materials, the filler of the type referred to, together with the starch or starch and alum into the beater, or other similar or compounding or mixing or disintegrating or treating machine. This furnish is then given the usual treatment, and run off on the paper machine in the regular manner. My invention, however, is not confined to this particular method, as it also includes the addition of starch or starch and alum to one or more of the other ingredients of the furnish at any other convenient point either before or during the paper manufacturing process, and moreover it comprehends any order of the mixing of the starch or the starch and alum and one or more of the other ingredients, although of course, where starch and alum are both used, they need not necessarily be added at the same time or point. Moreover, it embraces the addition of starch or starch and alum to one or more of the other ingredients by steps or stages if desired, instead of by the addition of the entire amount of the starch or the starch and the alum at one time, and of course, here, as above, where starch and alum are both used, they need not necessarily be added at the same time or point.

Starch in the condition in which it ordinarily occurs in commerce, is a white powdery material, substantially insoluble in cold water. For my purpose, however, it is necessary to convert such starch into what is known as the colloidally soluble or gelatinous condition before it becomes effective, except of course in those cases where a modified starch is used which already gives a colloidal solution with water without further preparation. There are a number of methods of converting starch into gelatinous form and the scope of my invention comprehends the use of starch gelatinized by any known means. Several examples of known methods of gelatinizing starch follows:

(1) Heating starch in contact with water up to or above the temperature,—varying with the different kinds of starch,—at which gelatinization occurs;

(2) The action of a solution of alkali, as sodium hydroxide, on starch in the cold;

(3) Attrition of starch as by grinding in a ball mill whereby the outer skin of the starch granule is ruptured or otherwise broken, and gelatinization of such starch then takes place in the cold.

In the practice of my invention, the gelatinization of the starch by heat in the presence of a sufficient amount of water is a convenient method. A satisfactory way is to mix the starch thoroughly with water of a temperature below that of the gelatinization point of the starch in question, heat the mixture until gelatinization takes place, and although not necessary, the heating may be carried almost or to the boiling point if desired. Agitation may be conveniently employed. The gelatinized starch solution may then be cooled before use if desired. This solution of gelatinized starch is the ordinary way in which I introduce gelatinized starch into the paper making process.

Although the preparation of the starch as above with water is a simple method of accomplishing gelatinization, the scope of my invention includes the admixture of the starch prior to, during, or after its gelatinization with various of the other materials with which it may be subsequently used, and its introduction with them into the process. It also includes the introduction of the gelatinized starch into the process in dry or in non-aqueous form, alone or in combination with various other materials. Moreover it also includes the introduction of starch in the process in which the starch is to be employed, and the conversion of such starch into gelatinous form during the practice of such process.

However the introduction of previously gelatinized starch in dry form mentioned above is not intended to include previously gelatinized starch which has been dried with heat in contact with fibre and/or filler prior to its use in the furnish. This is the form in which any starch would exist which might fortuitously be present, usually in relatively small amounts, in any of the broke or reworked papers either uncoated or coated which might be used in the furnish. Such previously gelatinized starch, dried with heat in contact with fibre and/or filler, is not reconverted to any substantial degree, under the conditions obtaining in the stock preparation process, to the desired colloidal gelatinous condition, and is thus substantially ineffective in the prevention of foam.

There are many kinds of starch, and in the practice of my invention I do not restrict myself to the use of any particular kind of starch, as I have found various kinds of starch, or mixtures of starches, or materials of starchy nature, suitable for my purpose; but inasmuch as in the United States corn starch is normally the cheapest kind of starch, that is the starch which I commonly find it advantageous to use. Moreover, I do not restrict myself to the use of ordinary, that is, what is known as the "unmodified" starches, as my invention includes also the use of starches which are modified in varying degrees, or in various manners, or are combined with one or more other constituents as for instance with a chemical group derived from one or more modifying agents. Also instead of the use of commercial starch, the use of material containing starch, or containing modified starch or combined starch, is within the scope of my invention.

Moreover in the use of a salt of aluminum I do not intend to restrict myself to the sulphate, as other aluminum salts may be used. If alum, however, be used, I may avail myself of any type of alum, whether acid, normal or basic, as any of the sulphates of aluminum or double salts known as "alums" are suitable. However, in practice, because of its cheapness and convenience, the salt of aluminum which I find it advantageous to use is ordinary commercial aluminum sulphate, commonly known as alum. This may be procured in the hydrous or anhydrous form as is most convenient, and may be used in any suitable way, such for example as a solid, usually in powdered form, or in solution, all such methods being comprehended within the scope of my invention. Moreover, the alum used need not be in the chemically or commercially pure condition but may be introduced in conjunction with other materials which may be present merely as impurities with the alum, or which may be introduced designedly or fortuitously with the alum.

The ingredients ordinarily used in paper making are fibrous materials, fillers, sizes, coloring matters, and the like, and all such ingredients may be used in conjunction with the starch or starch and alum within the scope of my invention. Any of the ordinary fibrous materials are suitable, according to the type of paper desired, and moreover other fillers may be used in conjunction with the fillers of the type referred to. Inasmuch, however, as the reaction of the stock is on the alkaline side of the neutral point, sizes which depend for their efficacy upon the production and maintenance of an acid condition in the paper stock, such as for instance rosin size when used in the customary manner, are not suitable for use, and moreover, the coloring matters used are preferably those resistant to alkaline conditions.

There are some cases where paper made with the type of fillers referred to, either as a filling or coating constituent, or both, is reused in the paper making process. Such papers may be those known to the trade as "old papers" or "old waste papers" or "waste papers" in any form, or returned trimmings or damaged paper or the like, or they may be the "broke", that is, the partially made, the imperfect, or the waste paper which accompanies the paper making, finishing, storing, packing, shipping, or the like operations in a paper mill, and which is reworked either in the same or some other mill. Such papers are sometimes reworked by themselves and added in broken down or in pulp form in the paper making process, being treated or cooked in some cases with or without chemicals and washed if desired,—this reworking meaning to include the process of deinking if such is practiced or of bleaching or of both deinking and bleaching,—or sometimes they are added directly to the other paper making ingredients in the beater or similar or other mixing or disintegrating or treating or compounding machine, and broken up directly therein.

The reuse in paper making of such papers as referred to in the preceding paragraph involves the introduction of a certain amount of the type of filler referred to into the paper making process and into the paper made therein. Where there is introduced into the paper making process such papers originally containing some of the type of fillers referred to, the amount of which filler compared with the total furnish is so small that any such filler present is decomposed substantially completely by the alum or other acidic material normally present or added for such purpose,—or if not so decomposed is present only in such a quantity as to represent an insignificant percentage on the weight of the final paper, such for example as in the vicinity of a percent or less,—the foam producing tendency of such small amount of such filler is substantially negligible. However where the introduction of such filler by such papers is substantially larger in quantity it tends to cause in some cases the excessive and persistent foam which I have previously described. Hence the use of starch, or starch and alum for the reduction, elimination, prevention, or alteration of foam in such cases, and in the paper thus made, is within the scope of my invention. This is, of course, the case not only where such papers constitute the only source of such filler introduced, but also where they constitute only one source of the introduction of such filler, other quantity or quantities of such filler being incorporated in addition in the paper making process.

As illustrative of experimental furnishes which without starch or without starch and alum gave excessive foam, but which with starch or with starch and alum gave satisfactory results, I give the three following:

*Furnish A—Magazine grade*

| | |
|---|---|
| Sulphite pulp, bleached | 373 |
| Sulphite pulp, unbleached | 231 |
| Soda pulp, bleached | 234 |
| Reworked old magazine papers (de-inked) | 600 |
| Calcium carbonate and magnesium hydroxide | 860 |
| Starch (potato) | 70 |

*Furnish B—Magazine grade*

| | |
|---|---|
| Sulphite pulp, bleached | 350 |
| Soda pulp, bleached | 435 |
| Reworked old magazine papers (de-inked) | 600 |
| Broke (defective paper to be reworked) | 180 |
| Calcium carbonate and magnesium hydroxide | 720 |
| Starch (corn) | 90 |
| Alum (ordinary $Al_2(SO_4)_3 18H_2O$ | 56 |

*Furnish C—Thin opaque book grade*

| | |
|---|---|
| Sulphite pulp, bleached | 1300 |
| Calcium carbonate and magnesium hydroxide | 759 |
| Starch (potato) | 75 |
| Alum (ordinary $Al_2(SO_4)_3 18H_2O$ | 40 |

In the above furnishes, the figures refer to pounds air dry weight in each case except that of the filler (calcium carbonate and magnesium hydroxide) in which case the figure given refers to pounds bone dry weight.

In regard to the question of how much starch or starch and alum is to be used in a given case, a convenient method of arriving at what are suitable amounts to employ is to use what would probably be enough at first, for instance at least proportionately as much as shown in furnish B, and then to reduce the quantities in successive beaters until troublesome foam first starts to make its appearance. The run may then be continued using amounts which have thus been shown to be enough to eliminate foam troubles. A suitable relation between the amounts of alum and starch may then be arrived at in a similar manner, by keeping the starch content at its determined point and gradually reducing the alum in successive beaters till stray foam appears and the "feel" of the stock begins to change, and then using an amount of alum somewhat greater than the amount used when this change was noted.

The above furnishes A, B, and C, are intended as illustrative only, and of course I do not mean to restrict my invention to these furnishes, as I have found that other widely differing furnishes give satisfactory results. Nor do I mean to restrict myself to the relative proportions of fibre, filler, starch, or starch and alum, or of starch to alum used in the illustrative furnishes, as I have found varying proportions of these ingredients to be suitable. Moreover, the experimental tests and experimental runs on paper machines mentioned herein are merely illustrative of other experimental tests and experimental runs made in the development of my invention, and my invention is not, of course, restricted to the results of the tests and runs cited herein.

Whereas I have described paper made on a Fourdrinier machine my invention is not limited to paper made on such machines, but is also applicable to paper made on cylinder machines, or on any other machines or devices used for making paper. Moreover in the manufacture of paper by my process it is not necessary to employ any auxiliary machinery or equipment as the standard machinery or equipment is well adapted for the purpose, but of course if auxiliary machinery or equipment is desired to be employed, it may be used with satisfactory results. Furthermore the paper made by my process may be calendered, and finished and if desired, converted by any of the processes or with any of the machinery and equipment employed for these operations.

In this specification I have advanced several theories as partial or complete explanation of various conditions and effects, such as the theory purporting to explain the persistence of the foam obtained in some cases with the type of fillers referred to, the theory of the action of starch on these fillers and on the foam occurring therewith, and any other theory or theories herein referred to; but I wish it to be distinctly understood that the scope of my invention is independent of theory, and that my invention is not limited or affected by the above theories, or by their validity or invalidity; as the facts are, regardless of these or any other theories, that the addition of starch to a furnish run with the type of fillers referred to which gives excessive foam so alters the furnish that the foam is reduced or completely or almost completely eliminated or prevented from forming or changed to a condition in which it is easily broken down, so that satisfactory paper can be made therefrom under conditions in which that was hitherto impossible or extremely difficult; and that the addition of starch with alum improves the results obtained with starch alone both as to quality of paper and as to machine operation.

When in the specification I speak of the "reduction, elimination, prevention or alteration" of foam, I do not necessarily mean the absolute removal of all foam, but what I do mean, insofar as it applies to the paper industry, is the reduction of foam to the point where conditions are satisfactory for practical machine operation and where satisfactory paper can be manufactured.

In the specification and claims: (1) where I use the word "paper" I use it in its broad sense to include products of manufacture of all types and of all weights and thicknesses, which contain as an essential constituent a considerable amount of prepared organic or inorganic fibre or both and which are capable of being produced on a Fourdrinier, cylinder, or other forming, or felting, or shaping, or molding machine; (2) where I refer to a substance as "acid soluble" I mean a substance which is soluble in acid and one which when left in contact with cool freshly boiled distilled water for an appreciable length of time will impart to the water a pH value of more than 7, i. e., a pH value which is on the alkaline side of the neutral point; (3) where I use the expression "alkaline earth metal" I mean to include therein not only the elements calcium, strontium, and barium, but also magnesium; (4) where I use the word "foam", I mean it to be synonymous with the word "froth".

By the expression "paper stock" or "stock" I mean an aqueous mixture of papermaking ingredients, such as is prepared in the papermaking process, at any stage of its preparation.

Where, in the claims, I use the expression "subjecting paper stock" as to the action of starch, or starch and an adjuvant such as alum, I mean that the starch or starch and adjuvant may be introduced into the paper stock in any of the ways and/or at any of the points indicated in this specification.

In the claims: (1) where I use the expression "elimination of foam", I mean to include not only those cases in which the foam is wholly or almost wholly eliminated, but also those in which the amount of foam formed is reduced, those in which the character of the foam is so changed that it breaks with relative ease, those in which foam is prevented from forming, and also cases in which two or more of the above possibilities are operative; (2) where I use the word "compound" I mean one or more compounds of the kind indicated; and (3) where I use the word "adjuvant" I mean one or more adjuvants.

It is to be understood, of course, that the order of steps, methods, procedure and details for use of my invention as outlined above are to be taken as preferred examples thereof, and that various changes may be resorted to in the practice of my invention without departing from the spirit of my invention or the scope of the subjoined claims.

I claim:

1. In the manufacture of paper, the method for the elimination of foam comprising subjecting paper stock containing acid soluble filler which stock otherwise would produce deleterious foam in paper manufacture to the action of starch.

2. In the manufacture of paper, the method for the elimination of foam comprising subjecting paper stock containing acid soluble filler comprising calcium carbonate which stock otherwise would produce deleterious foam in paper manufacture to the action of starch.

3. In the manufacture of paper, the method for the elimination of foam comprising subjecting paper stock containing acid soluble filler comprising calcium carbonate and magnesium compound which stock otherwise would produce deleterious foam in paper manufacture to the action of starch.

4. In the manufacture of paper, the method for the elimination of foam comprising subjecting paper stock containing acid soluble filler comprising calcium carbonate and magnesium hydroxide which stock otherwise would produce deleterious foam in paper manufacture to the action of starch.

5. In the manufacture of paper, the method for the elimination of foam, comprising subjecting paper stock containing acid soluble filler which stock otherwise would produce deleterious foam in paper manufacture to the action of starch and alum.

6. In the manufacture of paper, the method for the elimination of foam comprising subjecting paper stock containing acid soluble filler comprising calcium carbonate which stock otherwise would produce deleterious foam in paper manufacture to the action of starch and alum.

7. In the manufacture of paper, the method for the elimination of foam comprising subjecting paper stock containing acid soluble filler comprising calcium carbonate and magnesium compound which stock otherwise would produce deleterious foam in paper manufacture to the action of starch and alum.

8. In the manufacture of paper, the method for the elimination of foam comprising subjecting paper stock containing acid soluble filler comprising calcium carbonate and magnesium hydroxide which stock otherwise would produce deleterious foam in paper manufacture to the action of starch and alum.

9. In the manufacture of paper, the method for the elimination of foam comprising subjecting paper stock containing acid soluble filler which stock otherwise would produce deleterious foam in paper manufacture to the action of starch in gelatinized form.

10. In the manufacture of paper, the method for the elimination of foam comprising subjecting paper stock containing acid soluble filler which stock otherwise would produce deleterious foam in paper manufacture, to the action of starch in gelatinized form and an adjuvant adapted in association therewith to modify foam.

11. Paper substantially free from foam marks comprising paper ingredients which normally would produce deleterious foaming in the manufacture of paper, and starch.

12. Paper substantially free from foam marks comprising paper ingredients which normally would produce deleterious foaming in the manufacture of paper, and starch, and an aluminum compound.

13. Paper substantially free from foam marks comprising paper ingredients including acid soluble filler which ingredients normally would produce deleterious foaming in the manufacture of paper, and starch.

14. Paper substantially free from foam marks comprising paper ingredients including acid soluble filler comprising calcium carbonate which ingredients normally would produce deleterious foaming in the manufacture of paper, and starch.

15. Paper substantially free from foam marks comprising paper ingredients including acid soluble filler comprising calcium carbonate and magnesium compound which ingredients normally would produce deleterious foaming in the manufacture of paper, and starch.

16. Paper substantially free from foam marks comprising paper ingredients including acid soluble filler comprising calcium carbonate and magnesium hydroxide which ingredients normally would produce deleterious foaming in the manufacture of paper, and starch.

17. Paper substantially free from foam marks comprising paper ingredients including acid soluble filler which ingredients normally would produce deleterious foaming in the manufacture of paper, starch, and aluminum compound.

18. Paper substantially free from foam marks comprising paper ingredients including acid soluble filler comprising calcium carbonate which ingredients normally would produce deleterious foaming in the manufacture of paper, starch, and aluminum compound.

19. Paper substantially free from foam marks comprising paper ingredients including acid soluble filler comprising calcium carbonate and magnesium compound which ingredients normally would produce deleterious foaming in the manufacture of paper, starch, and aluminum compound.

20. Paper substantially free from foam marks comprising paper ingredients including acid soluble filler comprising calcium carbonate and magnesium hydroxide which ingredients normally would produce deleterious foaming in the manufacture of paper, starch, and aluminum compound.

21. Paper substantially free from foam marks comprising paper ingredients including old paper stock, acid soluble filler and starch.

22. Paper substantially free from foam marks comprising paper ingredients including old paper stock, acid soluble filler comprising calcium carbonate, and starch.

23. Paper substantially free from foam marks comprising paper ingredients including old paper stock, acid soluble filler comprising calcium carbonate and magnesium compound, and starch.

24. Paper substantially free from foam marks comprising paper ingredients including old paper stock, acid soluble filler comprising calcium carbonate, magnesium hydroxide, and starch.

25. Paper substantially free from foam marks comprising paper ingredients including old paper stock, acid soluble filler, starch and aluminum compound.

26. Paper substantially free from foam marks comprising paper ingredients including old paper stock, acid soluble filler comprising calcium carbonate, starch, and aluminum compound.

27. Paper substantially free from foam marks comprising paper ingredients including old paper stock, acid soluble filler comprising calcium carbonate and magnesium compound, starch, and aluminum compound.

28. Paper substantially free from foam marks comprising paper ingredients including old paper stock, acid soluble filler comprising calcium carbonate magnesium hydroxide, starch, and aluminum compound.

29. Paper substantially free from foam marks comprising paper ingredients including sulphite pulp, soda pulp, old paper stock, acid soluble filler comprising alkaline earth metal compound, and starch.

30. Paper substantially free from foam marks comprising paper ingredients including sulphite pulp, soda pulp, old paper stock, acid soluble filler comprising alkaline earth metal compound, starch, and aluminum compound.

31. In the manufacture of paper, the method for the elimination of foam comprising subjecting paper stock containing acid soluble filler which stock otherwise would produce deleterious foam in paper manufacture to the action of starch and an adjuvant adapted in association therewith to modify foam.

32. In the manufacture of paper, the method for the elimination of foam comprising subjecting paper stock containing acid soluble filler which stock otherwise would produce deleterious foam in paper manufacture to the action of starch and an aluminum salt.

33. Paper substantially free from foam marks comprising paper ingredients which with unflocculated acid soluble filler would have produced deleterious foam in the manufacture of paper, and flocculated acid soluble filler.

34. In the manufacture of paper from stock which contains acid soluble filler and which normally would produce deleterious foam in paper manufacture as result of the flotation of said acid soluble filler into the surfaces of bubbles present with consequent armoring thereof, the improvement which comprises flocculating said acid soluble filler whereby flotation of such filler into the bubble surfaces with consequent formation of deleterious foam is substantially prevented.

35. In the manufacture of paper from stock which contains acid soluble filler comprising calcium carbonate and which normally would produce deleterious foam in paper manufacture as result of the flotation of said calcium carbonate into the surfaces of bubbles present with consequent armoring thereof, the improvement which comprises flocculating said calcium carbonate whereby flotation of such calcium carbonate into the bubble surfaces with consequent formation of deleterious foam is substantially prevented.

36. Paper substantially free from foam marks comprising paper ingredients which with unflocculated calcium carbonate would have produced deleterious foam in the manufacture of paper, and flocculated calcium carbonate.

In testimony whereof I affix my signature.

HAROLD R. RAFTON.